May 17, 1949.   M. RONNING ET AL   2,470,724
FEED REGULATING MEANS FOR BALER TYING MECHANISMS
Filed April 8, 1944   2 Sheets-Sheet 2
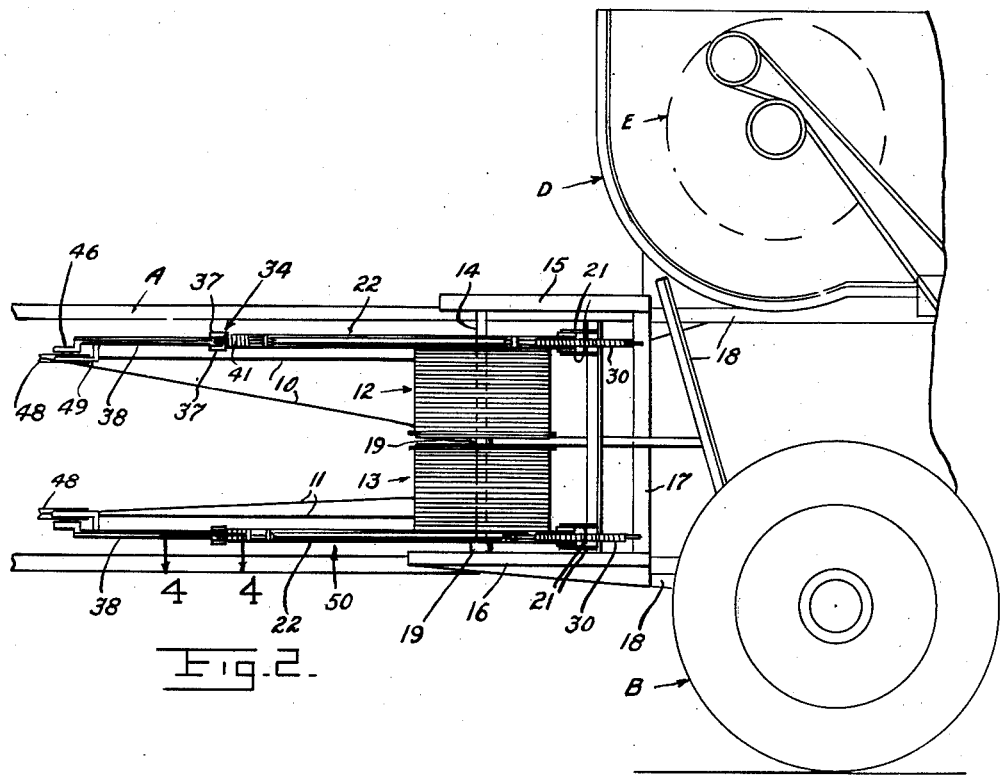
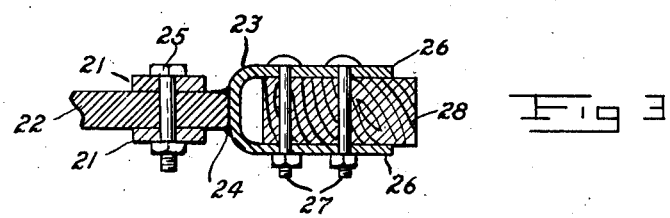
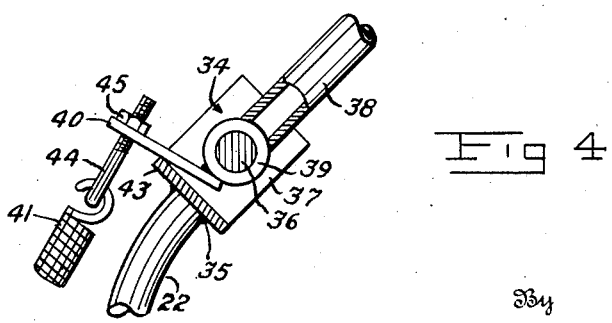
Inventors
MARTIN RONNING
KENNETH M. KEITH
By Carlsen & Harfe
Attorneys Patented May 17, 1949

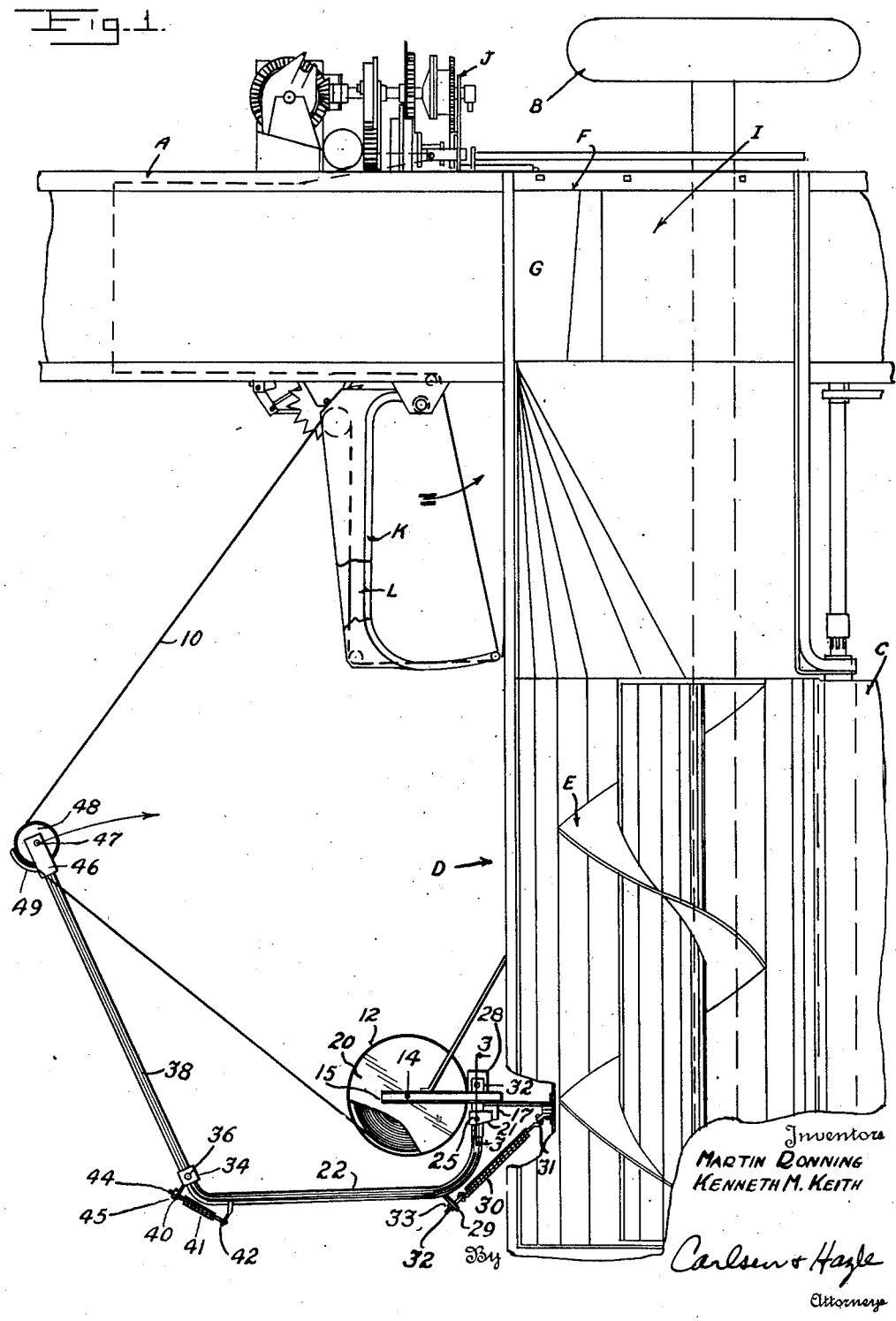

2,470,724

UNITED STATES PATENT OFFICE 2,470,724

FEED REGULATING MEANS FOR BALER TYING MECHANISMS

Martin Ronning, St. Louis Park, and Kenneth M. Keith, Minneapolis, Minn., assignors, by mesne assignments, to Minneapolis-Moline Company, Hopkins, Minn., a corporation of Minnesota Application April 8, 1944, Serial No. 530,090

6 Claims. (Cl. 100—20)

This invention relates generally to improvements in hay balers and similar machines for baling crop materials and more specifically to an improved means or mechanism for feeding to the machine the wire used for tying the bales.

The invention has particular application to automatic tying balers of the type disclosed in our co-pending application Serial No. 530,796, filed April 13, 1944, wherein the bales as they are accumulated in succession are automatically tied with two encircling wires. Such wires are taken from separate spools or reels and are fed to the machines by needles in such fashion, necessarily, that the wires coming from the spools are subjected to a number of sharp pulls or jerks. It is found that, without means for preventing it, this action causes trouble due to the spools overrunning and tangling the wires as such jerks occur, causing the wires to frequently become broken.

It is the primary object of our present invention to provide a regulating mechanism for the supply spools of such machines in which provision is made for feeding the wire to the needles smoothly and without any danger of tangling and breaking the wires. Another object is to provide mechanism of this nature wherein the spools are subjected to a braking effect the magnitude of which is controlled by the tension of the wire being paid off from the spools, to thus effectively prevent the spools from overrunning. A further object is to provide wire feeding means in which the wires running to the baler are maintained under a constant tension such as to facilitate proper feeding of the wires to and around the bales, and to the mechanism for tying the wires.

These and other more detailed and specific objects will be disclosed in the course of the following specification, reference being had to the accompanying drawings, in which—

Fig. 1 is a plan view of a medial portion of a traveling, or pick-up, automatic hay baler embodying our invention.

Fig. 2 is a side view of the machine as shown in Fig. 1.

Fig 3 is an enlarged fragmentary sectional view along the line 3—3 in Fig. 1.

Fig. 4 is a fragmentary sectional view along the line 4—4 in Fig. 2.

Referring now more particularly and by reference characters to the drawings, A represents the main, forwardly and rearwardly extending frame of the baler, supported upon wide spread ground wheels B and adapted at its forward end to be connected to a tractor or other draft means (not shown) to be drawn thereby over the field. The hay, or other material to be baled, is picked up from windrows in the field by a conventional form of combine pick-up mechanism, which is only fragmentally shown in Fig. 1, and which includes a canvas C for delivering the hay upwardly over the forward edge of a feed platform D extending laterally from the frame A. A feed auger E rotatable above the platform D urges the hay inwardly therealong toward a feed opening F in the upper side of frame A and the hay is urged downwardly through the feed opening into a baling chamber G within the frame by a feeder or packer (not shown) in a conventional manner. As the hay is charged into the baling chamber G it is urged rearwardly therein by a reciprocating plunger I, operated by a crank and power unit (neither shown) and the operation of this plunger presses the hay rearwardly in the chamber to and beyond a tying mechanism, designated generally at J. Cooperating with the tying mechanism J are upper and lower needles K and L the function of which is to feed a pair of wires or similar flexible elements around the ends and sides of the bale as it is accumulated and to the tying mechanism, which ties the wires to hold the bale together.

The bales are formed in succession, each forwardly of and against the preceding one, and the entire operation is continuous as the machine advances over the field. Details of the various mechanisms not herein specified are unimportant to the understanding of our present invention but will be found in our co-pending application hereinbefore identified.

In action the needles K and L intermittently swing inwardly through the baling chamber G and in such action feed upper and lower wires 10 and 11 to the machine. These wires are taken from continuous lengths coiled upon separate spools or reels 12 and 13 and it is found in practice that the intermittent, sharply varying pull exerted upon the wires 10 and 11, paying off from the spools, caused by the rapidly swinging movements of the needles, is very apt to cause the spools to overrun and the wires to become tangled thereon. Furthermore it is required that the wires 10 and 11 be kept taut under all conditions for the effective operation of the tying mechanism, and these factors have made the proper feeding of the wires off the spools a considerable problem. This problem we meet and overcome by the arrangement now to be described.

The spools 12 and 13 are supported for rotation about a vertical axis and are disposed in superimposed relation upon an upright shaft 14 which is secured at upper and lower ends, respectively, between upper and lower brackets or mounting plates 15 and 16, these brackets being secured to and rearwardly extended from an upright angle or bar 17 secured to parts of the frame 18 which supports the feed platform D. The spools are thus mounted well out to the end of platform D spaced from the side of the frame A and from the needles K and L. Between the upper and lower spools, and beneath the lower one, antifriction thrust bearings 19 are provided on the shaft 14 to insure free movement of the spools, even when heavily weighted with a full load of wire.

Adjacent the upper rim 20 of the upper spool 12, which rim is circular as shown, is mounted a pair of horizontally extending mounting ears 21 and between these ears is pivoted the forward end of a generally rearwardly extending main or spool release arm 22. The forward end of this arm is curved or turned inwardly to a point forward of the spool 12 in order to clear the same and is there provided with a U-shaped clip 23 welded to its extremity, as at 24, Fig. 3. A pin 25 or bolt mounts the arm 22 between the ears 21 and permits the arm 22 to swing freely in a horizontal plane, or parallel to the plane of the spool rim 20. Also mounted between the upper and lower sides 26 of the clip 23, as by bolts 27, is a brake shoe 28 in the form of a suitably shaped and sized block of wood.

A lug 29 is secured to the arm 22 adjacent the point at which it turns rearwardly and attached at one end to this lug is a retractile coil spring 30 the other, forward end of which is connected by a hook or clip 31 to the frame 18. The rear end of the spring 30 is connected to an eye screw 32 passed through the lug 29 and by adjusting a nut 33 on the screw it will be evident that the tension of the spring may be readily adjusted. The spring is so positioned as to normally bias the rear end of arm 22 in an outward direction and to urge the brake shoe 28 yieldably against the peripheral surface of the spool rim 20. A frictional braking effect is thus exerted upon the spool 12 by action of the spring 30.

The rear, free end of arm 22 is provided with another U-shaped clip 34 welded in place as indicated at 35 and pivoted on an upright pin or bolt 36 extending between upper and lower sides 37 of this clip is the outer end of a generally inwardly and rearwardly angled secondary or tensioning arm 38. For this purpose the end of this arm 38 has secured thereto a tubular bearing 39, as seen in Fig. 4, from which bearing extends a finger 40 in an outward direction. The finger 40 is secured to the bearing 39 to turn therewith and extending outwardly from between the sides 37 of the clip 34 the finger is exposed for the connection thereto of one end of retractile coil spring 41. The other end of the spring 41 extends outwardly of the arm 22 and is secured to a lug 42 thereon in such manner that the pull of the spring will bias the arm 38 for outward, rearward movement at its free end. Such movement is limited (see Fig. 4) by the stop afforded by contact of the finger 40 with the bight portion 43 of the clip 34 and when so limited the arm stands in the inwardly and rearwardly angled position described.

The rear end of spring 41, like that of spring 30, is hooked to an eye screw 44 which is passed through the finger 40 and provided with a nut 45 by which the tension of this spring may be adjusted.

The free end of the secondary arm 38 carries a bracket or bracket arm 46 welded thereto and journaled on a pin 47 carried by this bracket 46 is a peripherally grooved pulley 48 arranged to rotate about an upright axis. An arcuate guide loop or yoke 49 is provided and partially embraces this pulley to hold the wire in engagement with the groove therein, said loop being secured to the bracket 46.

An identical, double articulated arm and brake structure is provided for the lower spool 13, as designated generally at 50 in Fig. 2, but since the structure is identical it will not be described in detail. The same reference numerals are applied to similar parts wherever necessary. It will be noted that this lower mechanism 50 is aligned with the lower rim of such lower spool.

In operation, the wires 10 and 11 are drawn off from the spools 12 and 13 and threaded around behind the pulleys 48 and thence inwardly and forwardly to the needles K and L. Considering now the action of the upper spool, wire and needles only, it will be evident that the wire 10 when thus strung is pulled back or away from a line between spool 12 and needle K by the tensioning arm 38. This effect is caused by the spring 41 and the wire is initially so tensioned as to pull the arm 38 forward a short distance after which the spring 41 will exert a yieldable tensioning action on the wire to hold it taut between spool and needle.

It may here be noted that the comparative tensions of the springs 41 and 30 are so adjusted that this movement of the tensioning arm 38 will stretch only the spring 41 and the stronger, more highly tensioned spring 30 will hold the spool release arm 22 immobile.

Now as the needle K swings into the machine, in the direction of the arrow in Fig. 1, the wire 10 will be pulled sharply, swinging arm 38 forwardly even more and the pull exerted on the rear end of arm 22 then becomes sufficient to swing this arm inwardly on its pivot 25 whereupon the brake shoe 28 clears the spool flange 20 and permits the spool 12 to turn sufficiently to pay off the amount of wire required. Immediately as the tension is thus relieved the spring 30 reasserts itself to brake the spool and prevent it from overrunning, tangling the wire and causing it to break. The same action occurs as the wire is hitched rearwardly by successive plunger strokes urging the bale rearwardly and pulling on the wire.

Any reduction in wire tension such as occurs when the needles first start swinging inward, or for other reasons is taken up by the arm 38 which moves rearwardly to increase the length of the wire held back between spool and needle.

The action thus described takes place, of course, with both upper and lower wires and spools and in unison as the two needles K and L operate.

It will be evident from the foregoing that we have provided a simple and effective mechanism for mounting the spools, regulating the wire feed, tensioning the wires, and braking the spools under all conditions of operation, and that tangling of the wires is thus prevented.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. The combination with a baler having a bale tying mechanism and a rotatable spool of wire for feeding wire to said mechanism, of mechanism for regulating the feed of the wire to said tying mechanism, comprising, a brake member, a swingable arm for actuating said brake member, spring means operative to move said arm to normally apply the brake member to the spool, a second arm pivotally connected to and swingable on the first arm and engaging the wire to draw it away from a line between the spool and tying mechanism, and means responsive to movement of said second arm for swinging the first arm to release the brake member from the spool.

2. The combination with a baler having a bale tying mechanism and a rotatable spool of wire for feeding wire to said mechanism, of mechanism for regulating the feed of the wire to said tying mechanism comprising, a brake member, a swingable arm for actuating said brake member, spring means operative to move said arm to normally apply the brake member to the spool, a second arm pivotally connected to the first arm and engaging the wire to draw it away from a line between the spool and tying mechanism, a second spring means for normally swinging the second arm with respect to the first arm in a direction away from said line between spool and tying mechanism, and means for adjustably tensioning the said second spring means whereby an increase in tension of the wire above a selected magnitude will swing both arms to release the brake member from the spool.

3. The combination with a baler having a bale tying mechanism and a rotatable spool of wire for feeding wire to said mechanism, of mechanism for regulating the feed of the wire to said tying mechanism comprising, a brake member, a swingable arm for actuating said brake member, spring means operative to move said arm to normally apply the brake member to the spool, a second arm pivotally connected to the first arm and engaging the wire to draw it away from a line between the spool and tying mechanism, a second spring means for normally swinging the second arm with respect to the first in a direction away from said line between spool and tying mechanism, and means for adjustably tensioning the two spring means whereby a tension on the wire below a selected magnitude will swing only the second arm and an increase in such tension above that magnitude will swing both arms as a unit and release the brake member from the spool.

4. Wire tensioning and feeding means for a baler having a spool for supplying wire for tying the bales and a support, comprising in combination, a first arm pivoted on said support, a spool brake operated by said first arm, a first spring for biasing the first arm in one direction to yieldably hold the brake in braking relation to the spool, a second arm pivotally supported on the first arm for swinging movements therewith and with respect thereto, a second spring biasing the second arm in one direction, and means for supporting the wire in running engagement with the second arm.

5. Wire tensioning and feeding means for a baler having a spool for supplying wire for tying the bales and a support, comprising in combination, a first arm swingable on said support in one plane with respect to the spool, a spool brake operated by said first arm, a first spring connected to bias the first arm and urge the brake into engagement with the spool, a second arm pivotally connected at one end to the swingable end of the first arm for swinging movements with and independently of said first arm, the end of the second arm remote from its pivot having means engaging the wire drawn from the spool, a second spring connecting the arms and biasing the second arm in the same direction as the first arm is biased, and stop means arranged between the arms to limit movement of the second arm under influence of said spring.

6. In a wire tensioning and feeding mechanism for a baler having a spool carrying the wire and a brake for the spool, a pair of relatively swingable arms pivotally connected in end to end relationship and operative to swing also as a unit, one of said arms being operative on said brake, means on the other arm for engaging a wire paid off from the spool, and separate spring means tensioning the arms in the same direction.

MARTIN RONNING.
KENNETH M. KEITH.

REFERENCES CITED

The following references are of record in the file of this patent:

UNITED STATES PATENTS

| Number | Name | Date |
| --- | --- | --- |
| 268,235 | Hubbard | Nov. 28, 1882 |
| 1,008,767 | Young | Nov. 14, 1911 |
| 1,031,487 | Taylor | July 2, 1912 |
| 1,532,753 | Jones et al. | Apr. 7, 1925 |
| 1,671,976 | Avery | June 5, 1928 |
| 1,733,834 | Steele | Oct. 29, 1929 |